US011731600B2

(12) United States Patent
Roether et al.

(10) Patent No.: US 11,731,600 B2
(45) Date of Patent: Aug. 22, 2023

(54) ABS PRESSURE CONTROL VALVE ASSEMBLY

(71) Applicant: KNORR-BREMSE Systeme fuer Nutzfahrzeuge GmbH, Munich (DE)

(72) Inventors: Friedbert Roether, Cleebronn (DE); Kai Werner, Ludwigsburg (DE); Gerhard Wieder, Besigheim (DE); René Jonkmann, Stutgart (DE); Alexander Krumrey, Oberjettingen (DE); Reiner Maerkle, Ingersheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 251 days.

(21) Appl. No.: 17/281,217

(22) PCT Filed: Sep. 23, 2019

(86) PCT No.: PCT/EP2019/075502
§ 371 (c)(1),
(2) Date: Mar. 29, 2021

(87) PCT Pub. No.: WO2020/069896
PCT Pub. Date: Apr. 9, 2020

(65) Prior Publication Data
US 2021/0402967 A1 Dec. 30, 2021

(30) Foreign Application Priority Data
Oct. 1, 2018 (DE) ..................... 10 2018 124 179.8

(51) Int. Cl.
*B60T 8/36* (2006.01)
*B60T 13/68* (2006.01)
(Continued)

(52) U.S. Cl.
CPC .............. *B60T 8/3675* (2013.01); *B21K 1/20* (2013.01); *B60T 8/3605* (2013.01);
(Continued)

(58) Field of Classification Search
CPC ...... B60T 8/3605; B60T 8/3615; B60T 8/362; B60T 8/3675; B60T 13/683; B60T 15/18;
(Continued)

(56) References Cited

U.S. PATENT DOCUMENTS 2,645,308 A * 7/1953 Fitch ....................... B60T 15/18
303/29
2021/0402967 A1* 12/2021 Roether ................ B60T 13/683

FOREIGN PATENT DOCUMENTS

CH 279146 A 11/1951
CN 102470837 A 5/2012
(Continued)

OTHER PUBLICATIONS

EPO translation FR 2237096 A. (Year: 1975).*
International Search Report for PCT/EP2019/075502 dated Jan. 13, 2020.

*Primary Examiner* — Thomas J Williams
(74) *Attorney, Agent, or Firm* — Norton Rose Fulbright US LLP; Gerard Messina (57) ABSTRACT

An ABS pressure control valve assembly for controlling the fluid pressure in a pressure-medium-operated brake system of a vehicle having brake slip control, by which the brake pressure in pressure-medium-operated brake actuators is adaptively adjusted for a locking tendency of individual wheels of the vehicle. Two membranes of two membrane valves are clamped between two housing parts and an intermediate plate. Also described are a pressure-medium-operated brake system of a vehicle with brake-slip control, including at least one such ABS pressure control valve
(Continued)

assembly, and to a method for producing such an ABS pressure control valve assembly.

16 Claims, 7 Drawing Sheets

(51) Int. Cl.
  *F16K 11/22* (2006.01)
  *F16K 31/126* (2006.01)
  *B21K 1/20* (2006.01)
  *B60T 15/18* (2006.01)
  *F16K 11/24* (2006.01)
(52) U.S. Cl.
  CPC ............ *B60T 13/683* (2013.01); *B60T 15/18* (2013.01); *F16K 11/22* (2013.01); *F16K 11/24* (2013.01); *F16K 31/1262* (2013.01); *B60T 2270/10* (2013.01)

(58) Field of Classification Search
  CPC ....... B60T 2270/10; B21K 1/20; F16K 11/22; F16K 11/24; F16K 31/1262
  See application file for complete search history.

(56) References Cited

FOREIGN PATENT DOCUMENTS

| | | | | |
|---|---|---|---|---|
| CN | 106103219 | A | | 11/2016 |
| CN | 106379305 | A | | 2/2017 |
| DE | 4447305 | A1 | | 7/1996 |
| DE | 102008028440 | A1 | | 12/2009 |
| EP | 0147585 | A2 | | 7/1985 |
| EP | 0352522 | A1 | | 1/1990 |
| EP | 2303653 | A1 | | 4/2011 |
| FR | 1031060 | A | | 6/1953 |
| FR | 2237096 | A * | 3/1975 | ............ B60T 8/3605 |
| FR | 2584988 | A * | 1/1987 | ............ B60T 15/027 |
| KR | 20090117292 | A | | 11/2009 |

\* cited by examiner

ABS PRESSURE CONTROL VALVE ASSEMBLY

FIELD OF THE INVENTION

The present invention relates to an ABS pressure control valve assembly for controlling the fluid pressure in a pressure-medium-operated brake system of a vehicle with brake-slip control, by which the brake pressure in pressure-medium-operated brake actuators is adaptively adjusted in the event of a lockup tendency of individual wheels of the vehicle, as described herein, to a pressure-medium-operated brake system of a vehicle with brake-slip control as described herein, including at least one such ABS pressure control valve assembly, and to a method for producing such an ABS pressure control valve assembly as described herein.

BACKGROUND INFORMATION

An ABS (anti-lock brake system) prevents locking of the wheels and comes into operation if greater traction is required between a tire and the road than can be transmitted, that is to say if the driver overbrakes. In the event of overbraking, the central electronic controller of the ABS brake system identifies the brake locking tendency of one or more wheels from speed sensor signals and calculates therefrom the activation of the ABS pressure control valve assembly acting on the associated brake cylinder. The brake pressure is then adjusted to optimum slip by the ABS pressure control valve assembly by pressure reduction, pressure hold or pressure buildup according to the wheel behavior and thus the friction conditions between the tires and the road.

An ABS pressure control valve assembly according to the preamble is discussed in EP2303653B1. The two diaphragm valves are there arranged in parallel and in a coplanar manner.

SUMMARY OF THE INVENTION

An object underlying the invention is to develop further an ABS pressure control valve assembly of the type mentioned at the beginning in such a manner that it is more compact. At the same time, a corresponding method for producing such an ABS pressure control valve assembly is to be provided. Finally, there is also to be provided a pressure-medium-operated brake system of a vehicle with brake-slip control according to, which comprises at least one such ABS pressure control valve assembly.

This object may be achieved according to the invention by the features as described herein.

The invention starts from an ABS pressure control valve assembly for controlling the fluid pressure in a pressure-medium-operated brake system of a vehicle with brake-slip control, by which the brake pressure in pressure-medium-operated brake actuators is adaptively adjusted in the event of a lockup tendency of individual wheels of the vehicle, comprising at least:

a) a housing which has at least two housing parts, namely a first housing part and a second housing part, b) two diaphragm valves having diaphragms loaded by spring elements, namely an inlet diaphragm valve having an inlet diaphragm and an outlet diaphragm valve having an outlet diaphragm, c) an electrical signal input port for the inputting of electrical control signals of an electronic control device, d) solenoid valves, which can be activated by the electronic control device, for subjecting the diaphragm valves to pilot control by a control pressure in each case, namely a holding solenoid valve, which subjects the inlet diaphragm valve to pilot control by a first pilot pressure, and an outlet solenoid valve, which subjects the outlet diaphragm valve to pilot control by a second pilot pressure, e) a pressure relief port, which is connected to a negative pressure source, f) a pressure output port for the connection of at least one pressure-medium-operated brake actuator, g) a pressure input port for the connection of a device which generates a brake pressure, h) an intermediate plate which is arranged between the two housing parts, wherein i) the spring elements are supported on the one hand on the intermediate plate and on the other hand on the diaphragms, wherein j) in a first closed position the inlet diaphragm is urged in a sealing manner against a first diaphragm valve seat by at least a first spring element, and in a second closed position the outlet diaphragm is urged in a sealing manner against a second diaphragm valve seat by at least a second spring element, k) in a first lifted position the inlet diaphragm is lifted from the first diaphragm valve seat, whereby the pressure input port is connected to the pressure output port, and in a second lifted position the outlet diaphragm is lifted from the second diaphragm valve seat, whereby the pressure output port is connected to the pressure relief port, l) an outer edge of the inlet diaphragm is clamped between the first housing part and the intermediate plate, and wherein m) the first diaphragm valve seat is formed in the first housing part.

The invention is based on the idea that n) an outer edge of the outlet diaphragm is clamped between the second housing part and the intermediate plate, o) the second diaphragm valve seat is formed in the second housing part, p) there is formed in the intermediate plate at least a portion of an inlet control chamber which is delimited by the inlet diaphragm and to which the holding solenoid valve applies the first pilot pressure, q) there is formed in the intermediate plate at least a portion of an outlet control chamber which is delimited by the outlet diaphragm and to which the outlet solenoid valve applies the second pilot pressure, wherein r) there is formed in the intermediate plate at least a portion of a first control channel which connects the holding solenoid valve to the inlet control chamber, s) there is formed in the intermediate plate at least a portion of a second control channel which connects the outlet solenoid valve to the outlet control chamber, t) a first movement of the inlet diaphragm from the first closed position into the first lifted position and a second movement of the outlet diaphragm from the second closed position into the second lifted position are directed opposite to one another and in the direction towards the intermediate plate.

In particular, the inlet diaphragm and the outlet diaphragm are arranged coaxially.

A sandwich construction is thereby achieved, because the intermediate plate is arranged in particular directly between the first housing part and the second housing part. In particular, the intermediate plate is clamped between the first housing part and the second housing part. Furthermore, the control pressures are guided through the intermediate plate and the working fluid in the form of the pressure present at the pressure input port or of the pressure present at the pressure output port is guided past the two diaphragms.

As a result, the ABS pressure control valve assembly can be narrower, in particular also if the inlet diaphragm and the outlet diaphragm are arranged coaxially. As a result of the intermediate plate, it is also possible to omit two covers which cover openings into which diaphragms are inserted. As a result of the arrangement, it is possible to assemble the ABS pressure control valve assembly from one side, in particular from above, which is particularly suitable for automated assembly.

The construction of the ABS pressure control valve assembly according to the invention additionally permits shortened pressure medium guiding, wherein in particular the working stream is not diverted or is diverted only negligibly. Not least, a saving of material in various parts of the ABS pressure control valve assembly is possible.

As a result of the features mentioned in the dependent claims, advantageous further developments and improvements of the invention described herein are possible.

In particular it can be provided that a) a first portion of a first face, remote from the inlet control chamber, of the inlet diaphragm is subjected to the pressure prevailing at the pressure input port, and a second portion of this first face is subjected to the pressure prevailing at the pressure output port, and that b) a first portion of the second face, remote from the outlet control chamber, of the outlet diaphragm is subjected to the pressure prevailing at the pressure relief port, and a second portion of this second face is subjected to the pressure prevailing at the pressure output port.

According to a further development it can be provided that a) the first portion of the first face is larger than the second portion of the first face, and that b) the first portion of the second face is larger than the second portion of the second face.

It can be provided that a) a first control face, facing the inlet control chamber and cooperating with the first diaphragm valve seat, of the inlet diaphragm is larger than the sum of the first portion and the second portion of the first face, and that b) a second control face, facing the outlet control chamber and cooperating with the second diaphragm valve seat, of the outlet diaphragm is larger than the sum of the first portion and the second portion of the second face.

According to a further-developing measure it can be provided that a) in the first lifted position of the inlet diaphragm the pressure input port is connected to the pressure output port, and in the first closed position of the inlet diaphragm this connection is broken, and that b) in the second lifted position of the outlet diaphragm the pressure output port is connected to the pressure relief port, and in the second closed position of the outlet diaphragm this connection is broken.

It can also be provided that a) the holding solenoid valve is formed by a first 3/2-way solenoid valve, wherein its first port is connected to the pressure input port, its second port is connected to the first control channel, and its third port is connected to the pressure relief port, and b) the outlet solenoid valve is formed by a second 3/2-way solenoid valve, wherein its first port is connected to the pressure input port, its second port is connected to the second control channel, and its third port is connected to the pressure relief port.

The first 3/2-way solenoid valve (holding solenoid valve) can be configured such that, when unenergized, it connects its second port to its third port and blocks the first port. Further such that, when energized, it connects its first port to the second port and blocks the third port.

Furthermore, the second 3/2-way solenoid valve (outlet solenoid valve) can be configured such that, when unenergized, it connects its first port to its second port and blocks the third port. Further such that, when energized, it connects its second port to the third port and blocks the first port.

In particular, the holding solenoid valve can cooperate with the inlet diaphragm valve and the outlet solenoid valve can cooperate with the outlet diaphragm valve, on the basis of the control signal present at the signal input port, such that a) in response to a signal representing the "pressure buildup" state and present at the signal input port, the holding solenoid valve connects its second port to its third port and blocks its first port, and the outlet solenoid valve connects its first port to its second port and blocks its third port, b) in response to a signal representing the "pressure hold" state and present at the signal input port, the holding solenoid valve connects its first port to its second port and blocks its third port, and the outlet solenoid valve connects its first port to its second port and blocks its third port, c) in response to a signal representing the "pressure reduction" state and present at the signal input port, the holding solenoid valve connects its first port to its second port and blocks its third port, and the outlet solenoid valve connects its second port to its third port and blocks its first port.

In particular, the "pressure buildup", "pressure hold" and "pressure reduction" states can be brought about alternately by pulse-like activation (energization)/deactivation (deenergization) of the solenoid valves.

According to a further development, seals can be arranged between the first housing part and the intermediate plate and between the second housing part and the intermediate plate, in order to seal the control chambers and flow paths with respect to one another and from the atmosphere.

In particular there can also be provided a valve block in the form of a structural unit, which comprises the holding solenoid valve and the outlet solenoid valve. The valve block can in particular be clamped between the first housing part and the second housing part.

In particular there can also be provided a clamping arrangement/apparatus which clamp together the first housing part and the second housing part with the interposition of the intermediate plate and the valve block.

The invention relates also to a pressure-medium-operated brake system of a vehicle with brake-slip control, in particular an electropneumatic brake system with brake-slip control, comprising at least one above-described ABS pressure control valve assembly.

The device which generates a brake pressure can thereby be formed by a pneumatic foot-brake valve or by an electropneumatic pressure control module.

In the case of a foot-brake valve, the control pressure acting in the corresponding pneumatic channel therefore forms as the working pressure and is then increased to the desired level specified by a particular actuation of the foot-brake valve (pressure buildup), held at a particular level (pressure hold) or lowered to a particular level below the desired level (pressure reduction) by the ABS pressure control valve assembly.

In the case of a pressure control module of an EBS brake system, the ABS pressure control valve assembly is connected between the pressure control module and the brake actuator. The output pressure of the pressure control module thereby forms the working pressure, which is controlled in a closed loop in the pressure control module in dependence on electrical signals. The ABS control routines can then be implemented, for example, in a local electronic controller of the pressure control module.

In particular, the electronic control device can be formed by an ABS controller or by a controller in which ABS routines are implemented.

The invention relates also to a method for producing an above-described ABS pressure control valve assembly according to a first aspect, which is characterized by at least the following successive steps:

a) manufacturing the first housing part, the second housing part, the intermediate plate, the first and second spring element, and a valve block which comprises or integrates the holding solenoid valve and the outlet solenoid valve, b) clamping the second housing part in a clamping device and positioning the outlet diaphragm, together with the second spring element, and the valve block on the second housing part, c) positioning the intermediate plate on the second housing part, d) positioning the inlet diaphragm, together with the first spring element, on the intermediate plate, e) positioning the first housing part on the intermediate plate, and f) clamping the first housing part to the second housing part.

The invention relates also to a method for producing an above-described ABS pressure control valve assembly which is characterized by at least the following successive steps:

a) manufacturing the first housing part, the second housing part, the intermediate plate, the first and second spring element, and a valve block which comprises or integrates the holding solenoid valve and the outlet solenoid valve, and b) clamping the first housing part in a clamping device and positioning the inlet diaphragm, together with the first spring element, and the valve block on the first housing part, c) positioning the intermediate plate on the first housing part, d) positioning the outlet diaphragm, together with the second spring element, on the intermediate plate, e) positioning the second housing part on the intermediate plate, and f) clamping the first housing part to the second housing part.

In both these cases, therefore, the ABS pressure control valve assembly is assembled layer by layer from "bottom to top", according to which housing part is begun with.

Further measures improving the invention will be explained in greater detail hereinbelow, together with the description of an exemplary embodiment of the invention, with reference to the drawings.

DETAILED DESCRIPTION

Figure 1:
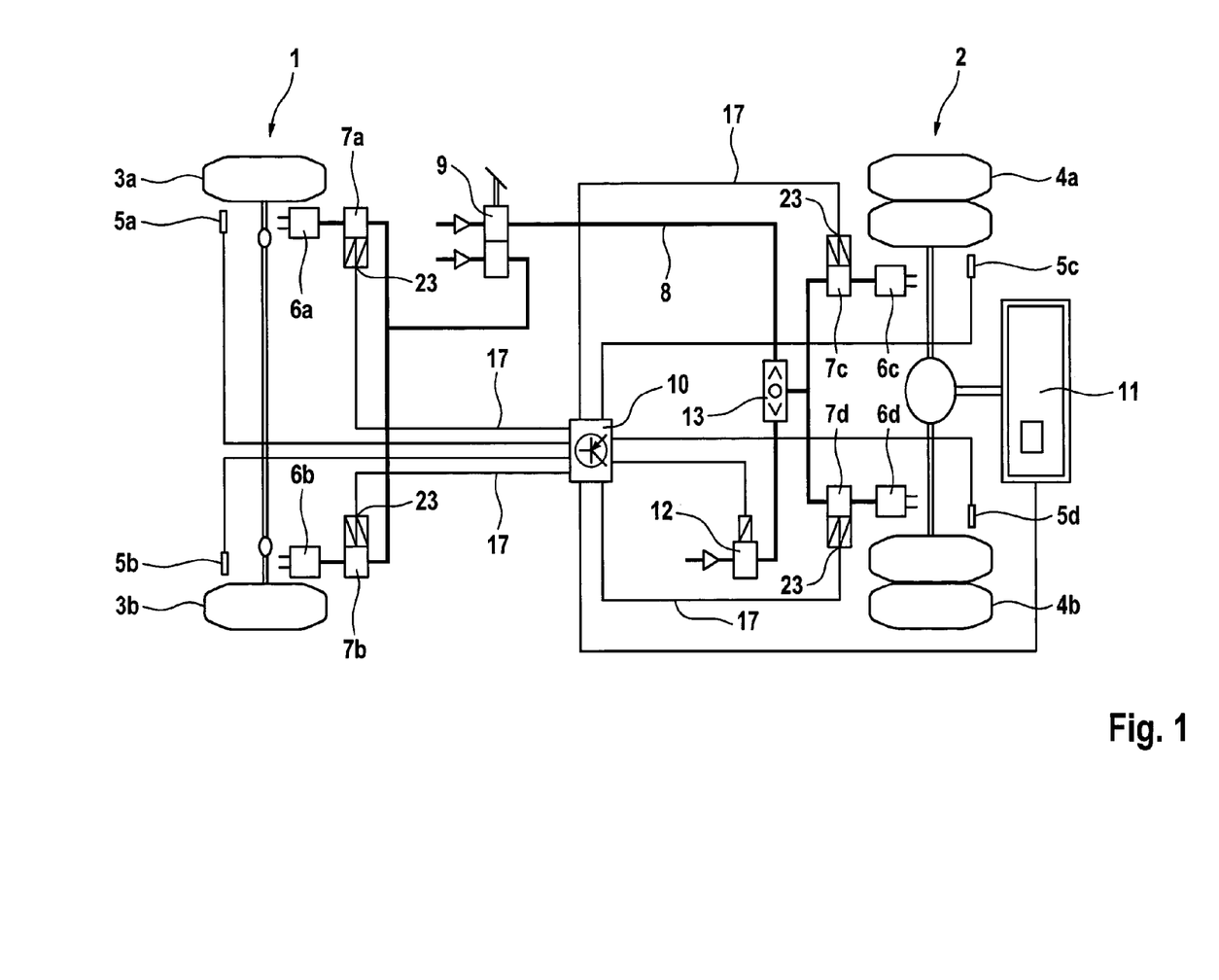
FIG. 1 is a schematic diagram of a brake-slip-controlled electropneumatic service brake device as an exemplary embodiment of a brake-slip-controlled service brake device having four ABS pressure control valve assemblies according to An exemplary embodiment.

According to FIG. 1, a vehicle equipped with a brake-slip-controlled, here, for example, electropneumatic, service brake device has a front axle 1 and a rear axle 2. On the front axle 1 there are arranged wheels 3a and 3b; the rear axle 2 has, for example, wheels 4a and 4b each equipped with twin tires. The electropneumatic service brake device which serves to brake these wheels 3a, 3b and 4a, 4b is here configured in the manner of a 4S/4C system (four sensors, four channels). This means that a total of four speed sensors 5a-5d and four ABS pressure control valve assemblies 7a-7d are available here. The ABS pressure control valve assemblies 7a-7d serve to activate associated pneumatic brake cylinders 6a-6d. All the pressure control valve assemblies 7a-7d are connected to a foot-brake valve 9 via a branching pneumatic brake pressure line 8. The pressure control valve assemblies 7a-7d consist substantially of two integrated diaphragm valves 14a and 14b and two spring-loaded solenoid valves 15a, 15b which activate the diaphragm valves. The diaphragm valves 14a and 14b, namely an inlet diaphragm valve 14a and an outlet diaphragm valve 14b, are each loaded in the closing direction by spring elements 16a, 16b and are subjected to pilot control via the associated solenoid valves 15a and 15b, namely a holding solenoid valve 15a and an outlet solenoid valve 15b.

On actuation of the foot-brake valve 9, the driver generates a brake pressure, which is transmitted via the pneumatic brake pressure line 8, passing through the ABS pressure control valve assemblies 7a-7d, to the brake cylinders 6a-6d associated with the wheels 3a, 3b and the wheels 4a, 4b.

The ABS pressure control valve assemblies 7a-7d can be activated via the integrated solenoid valves 15a, 15b shown in FIGS. 2 to 7 and are for this purpose electrically connected via signal lines 17 to a central electronic control unit 10. On the input side, the electronic control unit 10 is connected to the four speed sensors 5a-5b which determine the wheel speeds. In the event of locking of a wheel 3a, 3b or 4a, 4b, the brake pressure applied by the driver via the foot-brake valve 9 is influenced, in accordance with ABS control subject to the electronic control unit 10, by the corresponding pressure control valve assembly 7a-7d until the locking is eliminated. The ABS brake system of the present exemplary embodiment further comprises an ASR function, which comprises an ASR unit 11 for reducing the engine torque such as an ASR solenoid valve 12 and a shuttle valve 13.

The ABS pressure control valve assemblies 7a to 7d used within the context of the ABS control are here constructed in the manner of a 1-channel pressure control valve assembly, wherein the ABS pressure control valve assembly 7a is an example of the further ABS pressure control valve assemblies 7b to 7d and is shown separately in FIGS. 2 to 7. The further ABS pressure control valve assemblies 7b to 7d are constructed analogously. In this respect, the following description applies also to these ABS pressure control valve assemblies 7b to 7d.

Figure 2:
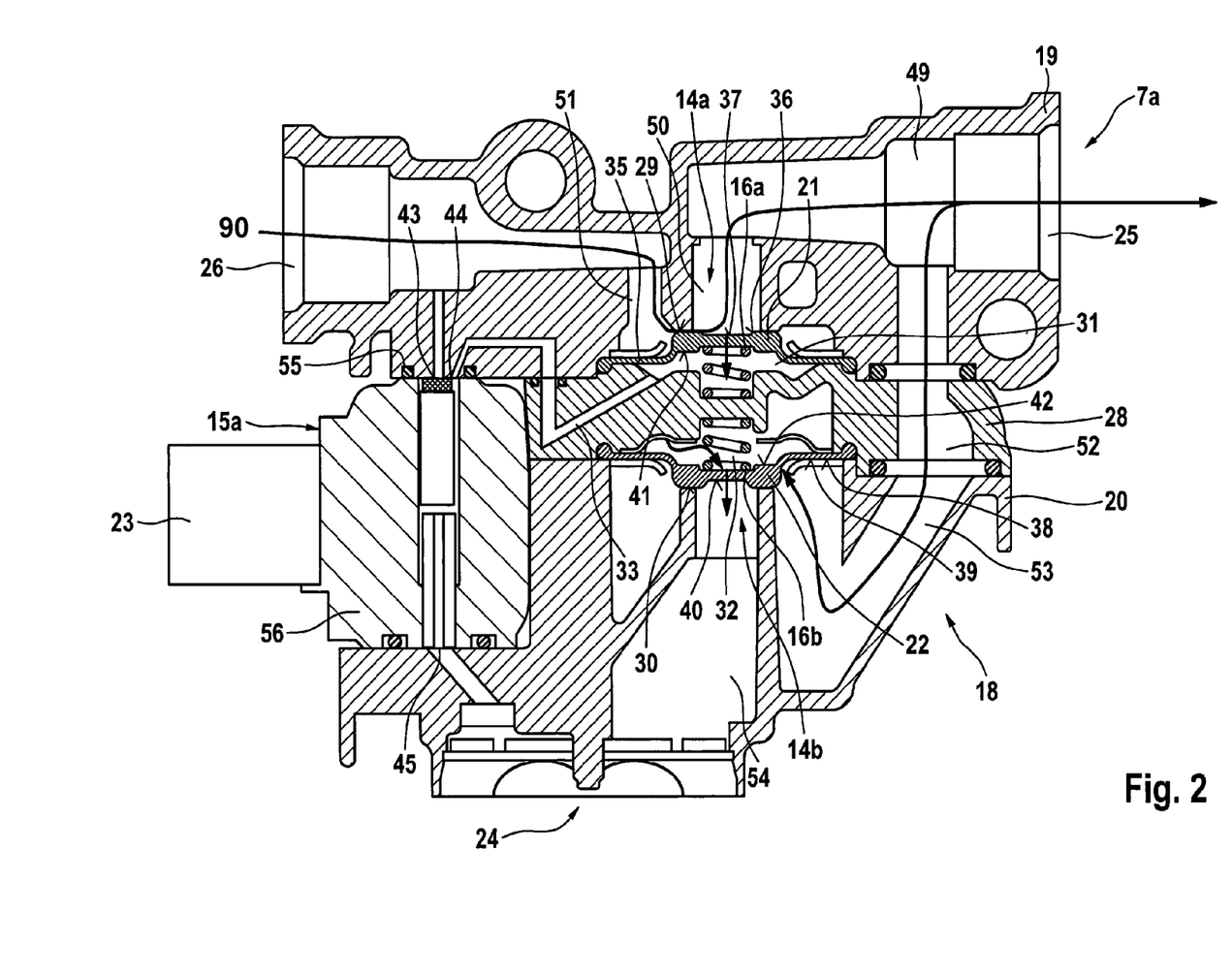
FIG. 2 is a cross-sectional view of an ABS pressure control valve assembly according to an exemplary embodiment in the "pressure buildup" state, wherein part of the cross-section is shown in a first plane in which the switching status of the holding solenoid valve is visible.

The part of the cross-section shown in FIG. 2 that relates to the holding solenoid valve 15a is shown in a first plane in which the holding solenoid valve 15a is visible. By contrast, in FIG. 3 the part of the cross-section shown in FIG. 2 that relates to the outlet solenoid valve 15b is shown in a second plane in which the outlet solenoid valve 15b is visible, wherein the first plane and the second plane are parallel to one another and offset in relation to the plane of the drawing. In FIGS. 2 to 7, the ABS pressure control valve assembly 7a is additionally shown in a position in which the right-hand side is arranged in an assembled position at the bottom and the left-hand side is arranged in the assembled position at the top. This will be mentioned in relation to the method described hereinbelow for producing the ABS pressure control valve assembly 7a.

The ABS pressure control valve assembly 7a comprises a housing 18, which here has two housing parts, for example, a first housing part 19 and a second housing part 20, two diaphragm valves having diaphragms loaded by spring elements 16a, 16b, namely the inlet diaphragm valve 14a having an inlet diaphragm 21 and an outlet diaphragm valve 14b having an outlet diaphragm 22, an electrical signal input port 23 for the inputting of electrical control signals, carried in the electrical signal line 17 in question, of the electronic control device 10, solenoid valves, which can be activated by the electronic control unit 10, for the pilot control of the diaphragm valves 14a, 14b by a control pressure in each case, namely the holding solenoid valve 15a (FIG. 2), which subjects the inlet diaphragm valve 14a to pilot control by a first pilot pressure, and the outlet solenoid valve 15b (FIG. 3), which subjects the outlet diaphragm valve 14b to pilot control by a second pilot pressure, a pressure relief port 24, which is connected to the atmosphere, a pressure output port 25 for the connection of the brake cylinder 6a, a pressure input port 26 for the connection of the brake pressure line 8 drawn from the foot-brake valve 9, an intermediate plate 28, which is arranged between the two housing parts 19, 20.

Figure 3:
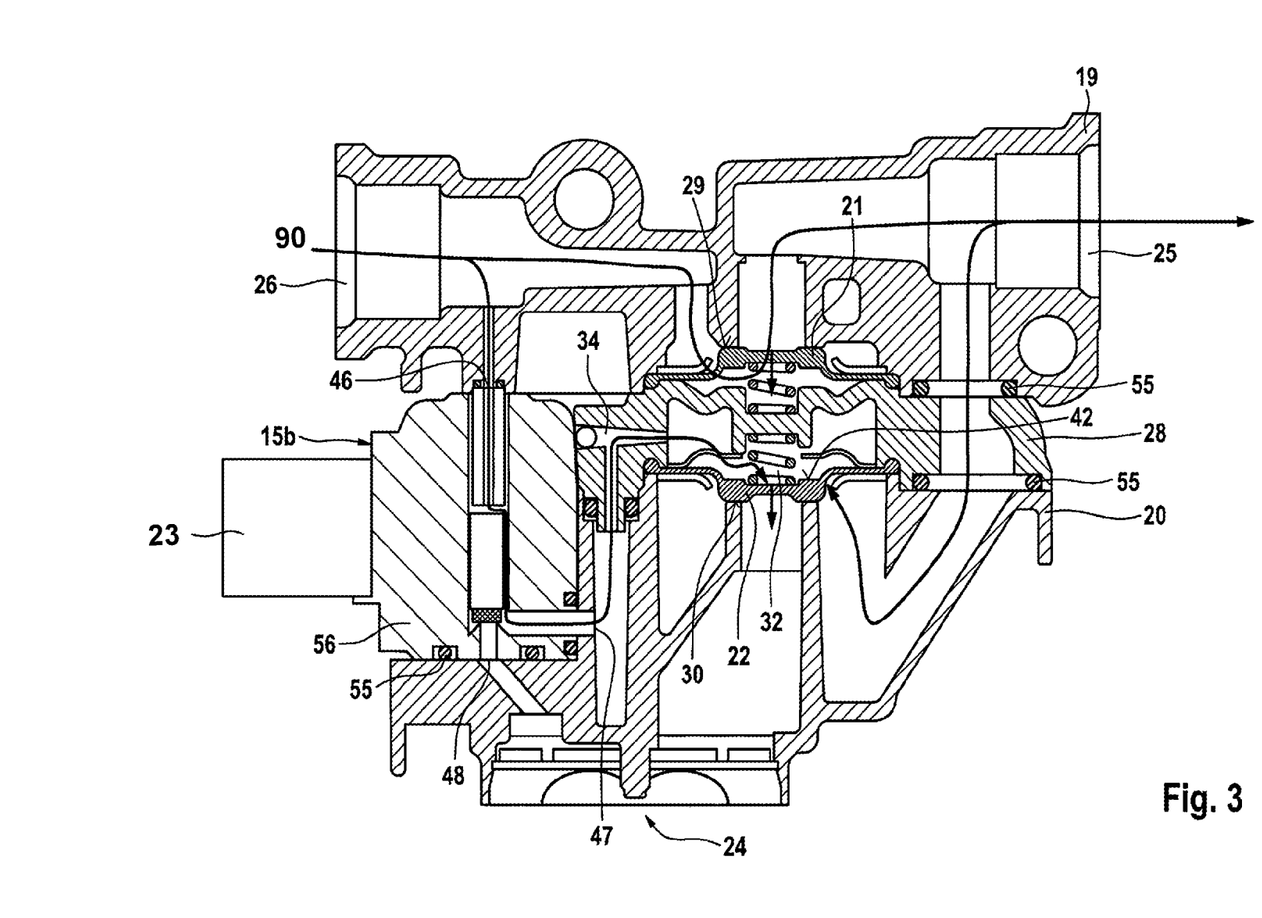
FIG. 3 is a cross-sectional view of the ABS pressure control valve assembly of FIG. 2 in the "pressure buildup" state, wherein part of the cross-section is shown in a second plane in which the switching status of the outlet solenoid valve is visible.

The spring elements 16a, 16b are supported on the one hand on the intermediate plate 28 and on the other hand on the diaphragms 21, 22. In particular, the inlet diaphragm 21 and the outlet diaphragm 22 are arranged coaxially.

In a first closed position the inlet diaphragm 21 is urged in a sealing manner against a first diaphragm valve seat 29 by a first spring element 16a, and in a second closed position the outlet diaphragm 22 is urged in a sealing manner against a second diaphragm valve seat 30 by a second spring element 16b. By contrast, in a first lifted position the inlet diaphragm 21 is lifted from the first diaphragm valve seat 29, whereby the pressure input port 26 is (becomes) connected to the pressure output port 25. The first diaphragm valve seat 29 is formed in the first housing part 19. In a second lifted position the outlet diaphragm 22 is lifted from the second diaphragm valve seat 30, whereby the pressure output port 25 is (becomes) connected to the pressure relief port 24.

An outer edge of the inlet diaphragm 21 is clamped between the first housing part 19 and the intermediate plate 28, while an outer edge of the outlet diaphragm 22 is clamped between the second housing part 20 and the intermediate plate 28 and the second diaphragm valve seat 30 is formed in the second housing part 20.

In the intermediate plate 28 there is formed an inlet control chamber 31 which is delimited by the inlet diaphragm 21 and to which the holding solenoid valve 15a applies the first pilot pressure (FIG. 2). There is further formed in the intermediate plate 28 an outlet control chamber 32 which is delimited by the outlet diaphragm 22 and to which the outlet solenoid valve 15b applies the second pilot pressure (FIG. 3).

In the intermediate plate 28 there are additionally formed a portion of a first control channel 33, which connects the holding solenoid valve 15a to the inlet control chamber 31 (FIG. 2), and a portion of a second control channel 34, which connects the outlet solenoid valve 15b to the outlet control chamber 32 (FIG. 3).

As is readily conceivable with reference to FIG. 2 and FIG. 3, a first movement of the inlet diaphragm 21 from the first closed position into the first lifted position and a second movement of the outlet diaphragm 22 from the second closed position into the second lifted position are directed opposite to one another and in the direction towards the intermediate plate 28 and in each case away from the two housing parts 19, 20.

In particular, a first portion 35 of a first face 36, remote from the inlet control chamber 31, of the inlet diaphragm 31 is subjected to the pressure prevailing at the pressure input port 26, and a second portion 37 of this first face 36 is subjected to the pressure prevailing at the pressure output port 25.

Furthermore, a first portion 38, for example, of a second face 39, remote from the outlet control chamber 32, of the outlet diaphragm 22 is subjected to the pressure prevailing at the pressure relief port 24, and a second portion 40 of this second face 39 is subjected to the pressure prevailing at the pressure outlet port 25.

The first portion 35 of the first face 36 may be larger than the second portion 37 of the first face, and the first portion 38 of the second face 39 may be larger than the second portion 40 of the second face 39.

It also may be provided that a first control face 41, facing the inlet control chamber 31 and cooperating with the first diaphragm valve seat 29, of the inlet diaphragm 21 is larger than the sum of the first portion 35 and the second portion 37 of the first face 36, and that a second control face 42, facing the outlet control chamber 32 and cooperating with the second diaphragm valve seat 30, of the outlet diaphragm 22 is larger than the sum of the first portion 38 and the second portion 40 of the second face 39.

As is conceivable in particular with reference to the arrows 90 in FIG. 2 and in FIG. 3, in the first lifted position of the inlet diaphragm 21 the pressure input port 26 is connected to the pressure output port 25, and in the first closed position of the outlet diaphragm 22 this connection is broken.

Figure 6:
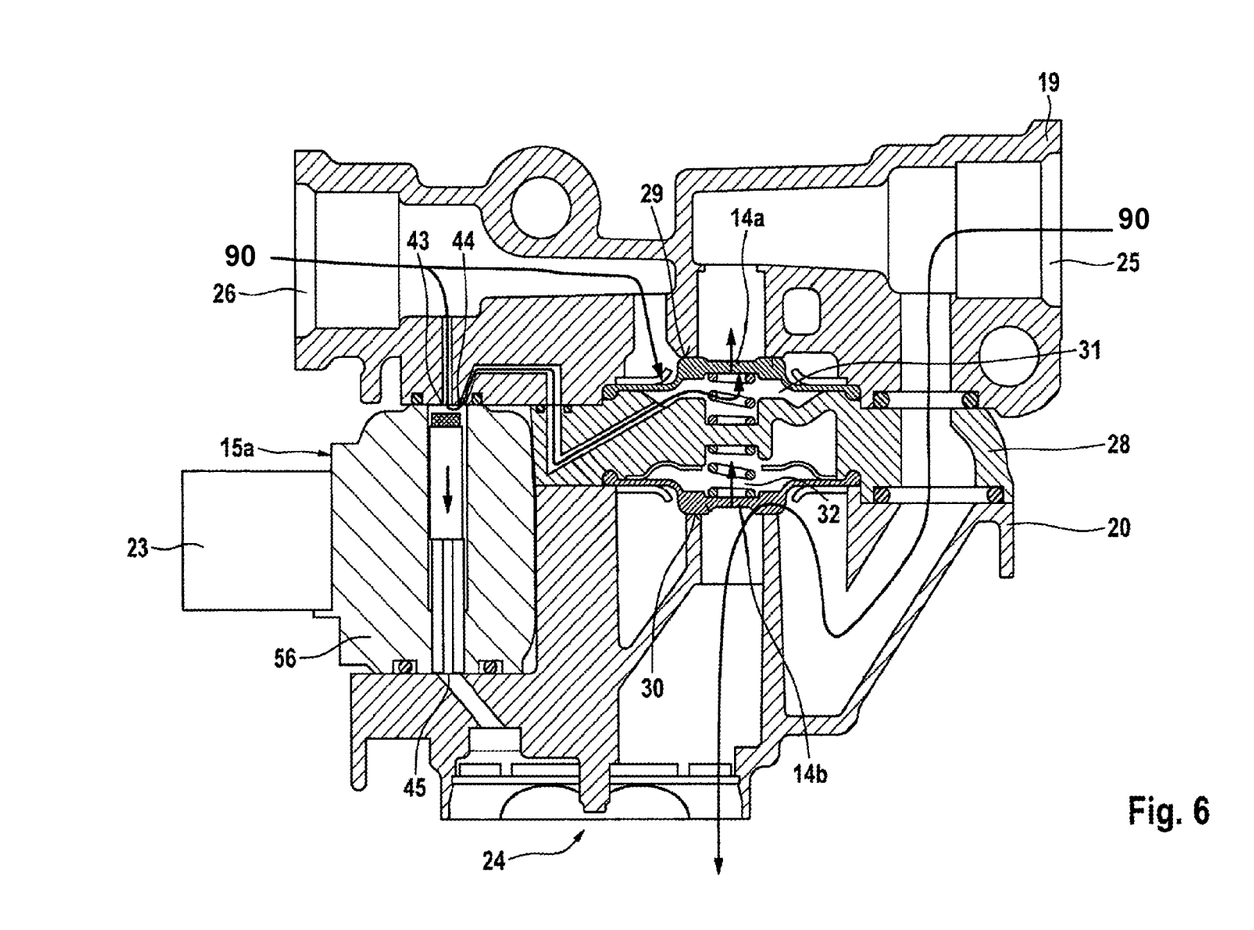
FIG. 6 is a cross-sectional view of the ABS pressure control valve assembly of FIG. 1 in the "pressure reduction" state, wherein part of the cross-section is shown in the first plane in which the switching status of the holding solenoid valve is visible.
Figure 7:
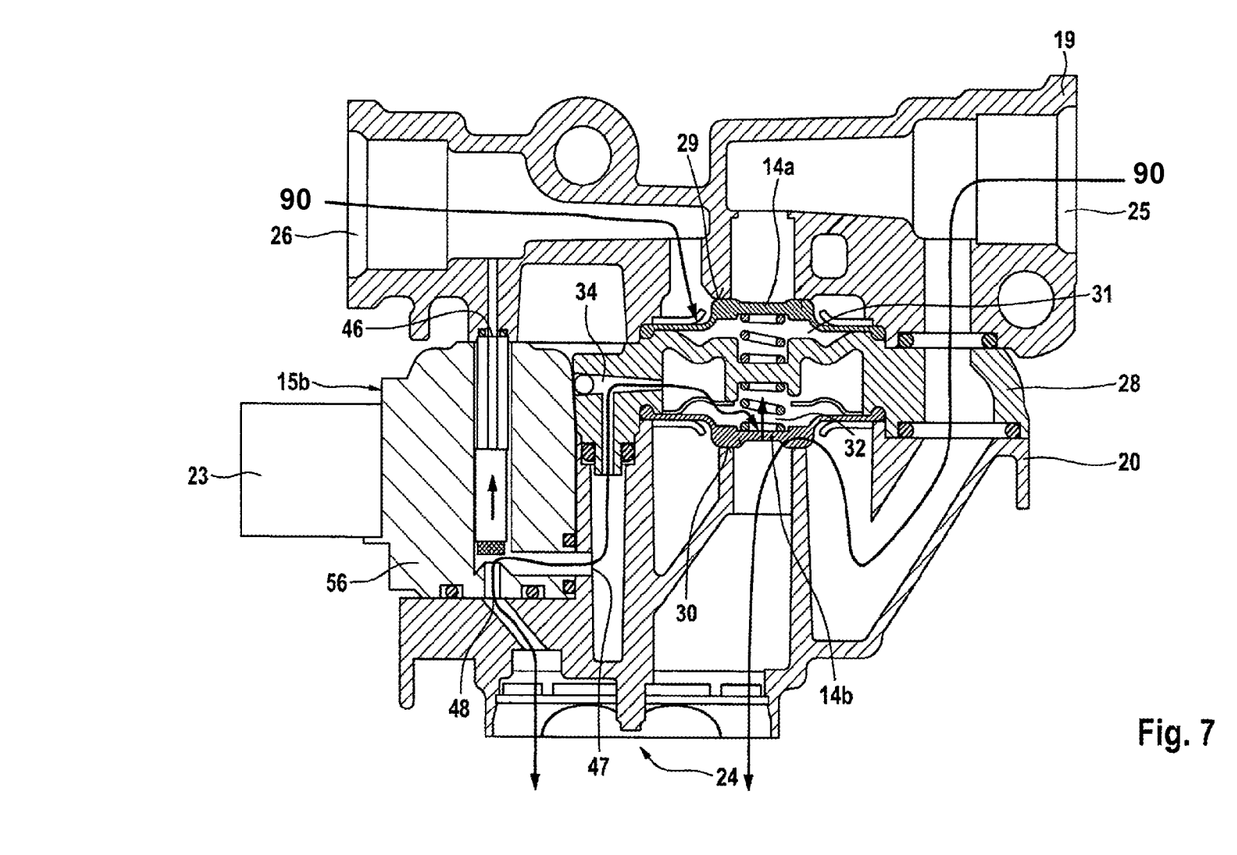
FIG. 7 is a cross-sectional view of the ABS pressure control valve assembly of FIG. 1 in the "pressure reduction" state, wherein part of the cross-section is shown in the second plane in which the switching status of the outlet solenoid valve is visible.

As is conceivable in particular with reference to the arrows 90 in FIG. 6 and in FIG. 7, in the second lifted position of the outlet diaphragm 22 the pressure output port 25 is connected to the pressure relief port 24, and in the second closed position this connection is broken.

It may be provided that the holding solenoid valve 15a is formed by a first 3/2-way solenoid valve, wherein its first port 43 is connected to the pressure input port 26s, its second port 44 is connected to the first control channel 33, and its third port 45 is connected to the pressure relief port 24 (FIG. 2). In particular, the first 3/2-way solenoid valve (holding solenoid valve) 15a is configured such that, when unenergized, it connects its second port 44 to its third port 45 and blocks the first port 43, and further such that, when energized, it connects its first port 43 to its second port 44 and blocks the third port 45.

The outlet solenoid valve 15b may also be formed by a second 3/2-way solenoid valve, wherein its first port 46 is connected to the pressure input port 26, its second port 47 is connected to the second control channel 34, and its third port 48 is connected to the pressure relief port 24 (FIG. 3). Furthermore, the second 3/2-way solenoid valve 15b (outlet solenoid valve) may be configured such that, when unenergized, it connects its first port 46 to its second port 47 and blocks the third port 48, and further such that, when energized, it connects its second port 47 to the third port 48 and blocks the first port 46.

As is shown in particular by FIG. 2, there is formed in the first housing part 19 a first channel 49i which connects the pressure output port 25 to a first chamber 50 which is delimited by the second portion 37 of the first face 36 of the inlet diaphragm 21. The first chamber 50 is surrounded by a first annular chamber 51, which is connected to the pressure input port 26, and is delimited by the first portion 35 of the first face 36 of the inlet diaphragm 21.

As is also shown in particular by FIG. 2, there is formed in the intermediate plate 28 a second channel 52 which connects the pressure output port 25 to a second annular chamber 53 which is delimited by the first portion 38 of the second face 39 of the outlet diaphragm 22. A second chamber 54 surrounded by the second annular chamber 53 is connected to the pressure relief port 24 and is delimited by the second portion 40 of the second face 39 of the outlet diaphragm 22.

The pressure input port 26 and the pressure output port 25 are formed in the first housing part 19 in parallel or coaxially, for example, but in particular facing away from one another. The pressure relief port 24 is formed, for example, in the second housing part 20. The center axes of the pressure input port 26 and of the pressure output port 25 can thereby be oriented approximately perpendicularly to the center axis of the pressure relief port 24.

Seals 55 may be arranged between the first housing part 19 and the intermediate plate 28 and between the second housing part 20 and the intermediate plate 28 in order to seal control chambers 31, 32 and control channels 33, 34 with respect to one another and from the atmosphere.

In particular there is also provided a valve block 56 in the form of a structural unit, which comprises or integrates the holding solenoid valve 15a, the outlet solenoid valve 15b and also optionally also the electrical signal input port 23. The valve block 56 is, for example, arranged directly next to the intermediate plate 28 and, like the intermediate plate, clamped between the first housing part 19 and the second housing part 20. In particular there is provided a clamping arrangement/apparatus, not shown here, which clamp together the first housing part 19 and the second housing part 20 with the interposition of the intermediate plate 28 and the valve block 56. There can be used as a clamping arrangement/apparatus, for example, screw connections, brackets or snap-in hooks, not shown here.

The mode of functioning of the ABS pressure control valve assembly 7a will be described hereinbelow, wherein the starting point is a service brake operation which the driver initiates by actuating the foot-brake valve 9 and thereby generates a brake pressure corresponding to the actuation in the service brake line 8 and also at the pressure input port 26. It is thereby assumed that intervention on the part of the ABS control is initially not necessary in the braking operation, so that, in this starting state, the holding solenoid valve 15a and the outlet solenoid valve 15b, for example, are unenergized. The signal present at the electrical signal input port 23 is then, for example, a "zero" signal, that is to say not an active signal, or does not represent energization. In particular, the holding solenoid valve 15a and the outlet solenoid valve 15b can be energized and deenergized separately and independently of one another via the signal line 17 and the signal input port 23.

As is apparent from FIG. 2 and FIG. 3, the unenergized holding solenoid valve 15a connects its second port 44, which is connected to the inlet control chamber 31, to its third port 45, which is connected to the pressure relief port 24, and blocks its first port 43, which is connected to the pressure input port 26. As a result, the inlet control chamber 31 is vented, so that the brake pressure present at the pressure input port 26 and outputted by the foot-brake valve 9, acting on the first portion 35 of the first face 36, allows the inlet diaphragm 21 to lift from the first diaphragm valve seat 29 into the first lifted position, as is illustrated by the arrow, whereby the brake pressure is fed through the inlet diaphragm valve 14a, as is illustrated by the flow path symbolized by the arrow in FIG. 2. The size ratios, already described above, of the faces 35, 36, 37, 41 at the inlet diaphragm 21 permit this mode of functioning. From there, the brake pressure passes to the pressure output port 25 and then into the associated brake cylinder 6a.

According to FIG. 3, the unenergized outlet solenoid valve 15b connects its first port 46, which is connected to the pressure input port 26, to its second port 47, which is connected to the outlet control chamber 32, and blocks its third port 48. As a result, the relatively high brake pressure prevails in the outlet control chamber 32 and then acts against the second control face 42 of the outlet diaphragm 22 and thereby urges the outlet diaphragm 22 in a sealing manner against the second diaphragm valve seat 30. The first portion 38, remote from the second control face 42v, of the second face 39 is likewise connected via the second channel 52 and the second annular chamber 53 to the pressure output port 25v, so that the brake pressure likewise acts on the first portion 38 of the second face 39. However, the first portion 38 of the second face 39 is smaller than the second control face 42. Furthermore, the atmospheric pressure acting via the second chamber 54 on the second portion 40 of the second face 39 is also not able to counteract it, so that a resulting force in the direction towards the second diaphragm valve seat 30 forms at the outlet diaphragm 22. The outlet diaphragm valve is then in its second closed position, so that no compressed air is able to pass to the pressure relief port.

Figure 4:
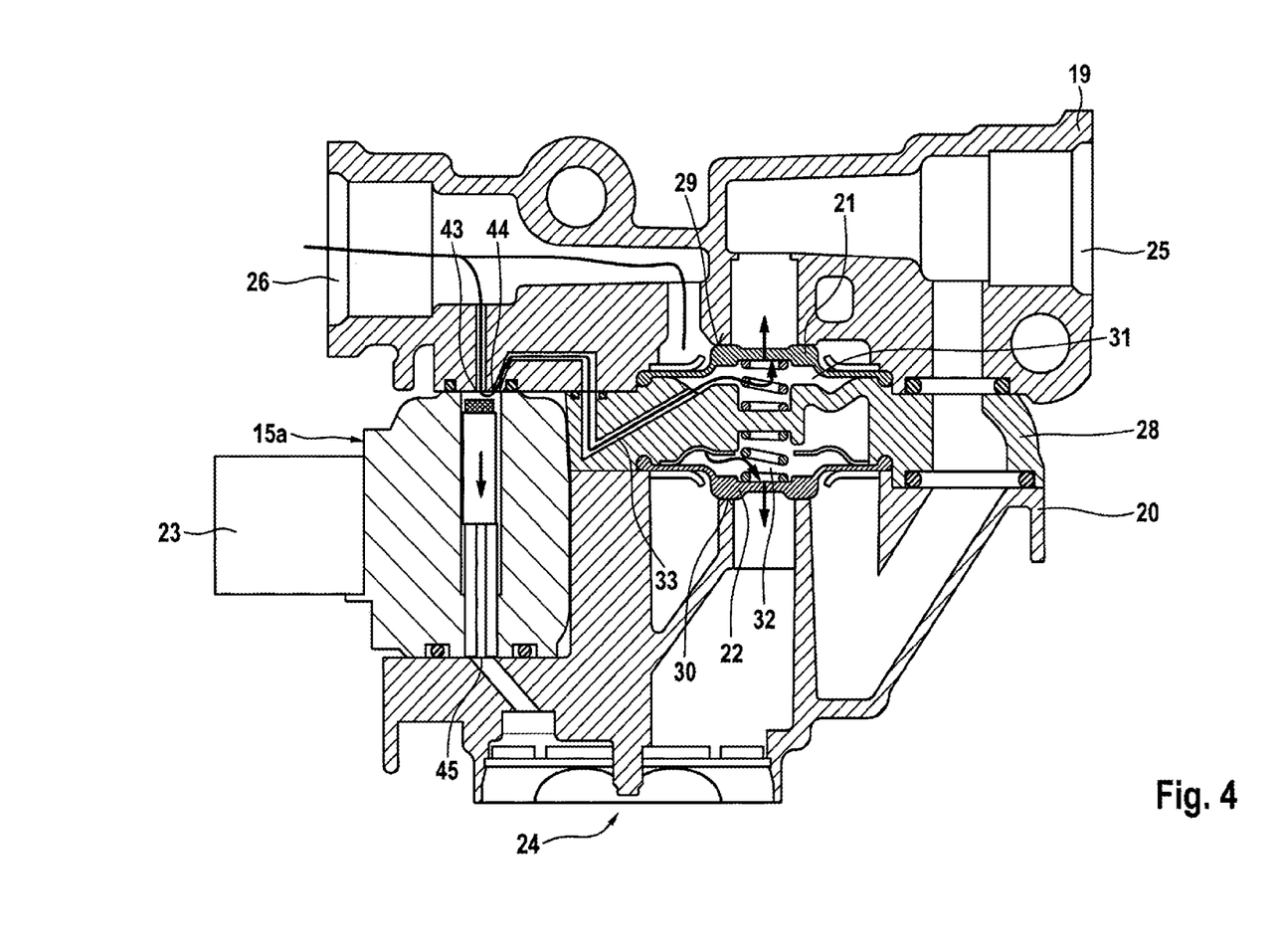
FIG. 4 is a cross-sectional view of the ABS pressure control valve assembly of FIG. 2 in the "pressure hold" state, wherein part of the cross-section is shown in the first plane in which the switching status of the holding solenoid valve is visible.
Figure 5:
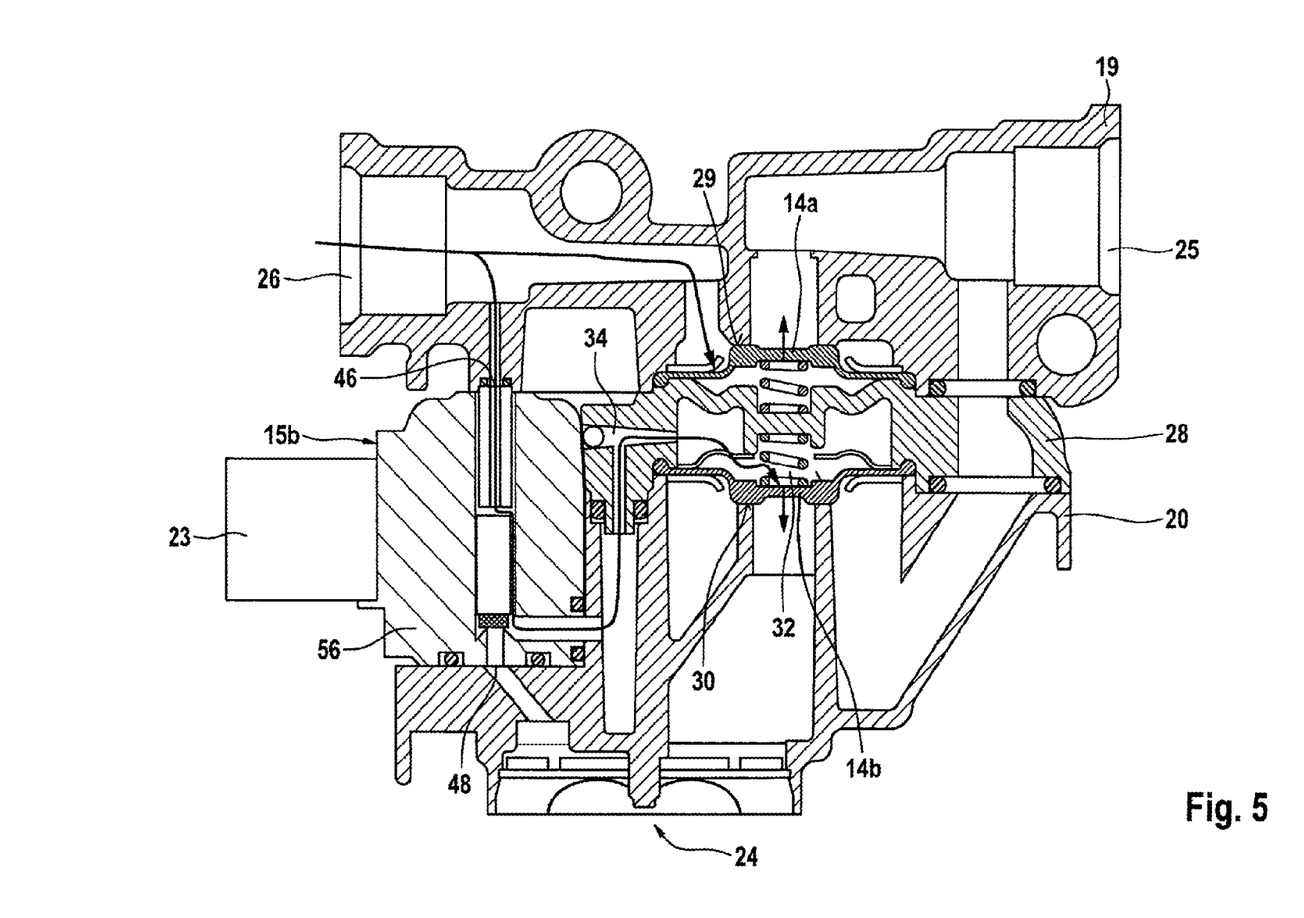
FIG. 5 is a cross-sectional view of the ABS pressure control valve assembly of FIG. 1 in the "pressure hold" state, wherein part of the cross-section is shown in the second plane in which the switching status of the outlet solenoid valve is visible.

If, during the course of the service braking operation, the ABS control determines, by monitoring the wheel speed at the brake cylinder 6a, that the actual brake slip at the corresponding wheel has reached a tolerated deviation in relation to an optimum brake slip, the ABS control in the electronic control unit 10 causes a signal representing the "pressure hold" state to be inputted into the electrical signal input port 23. This state is shown in FIG. 4 and FIG. 5.

The signal ensures that the holding solenoid valve 15a is energized and subsequently connects its first port 43, which is connected to the pressure input port 26, to its second port 44, which is connected to the inlet control chamber 31, and blocks its third port 45. As a result, the inlet control chamber 31 is placed under brake pressure via the first control channel 33, which has the effect that the inlet diaphragm 21 is urged in a sealing manner against the first diaphragm valve seat 29 and the connection between the pressure input port 26 and the pressure output port 25 is thereby broken, so that the brake pressure last acting in the brake cylinder 6a is "locked" and cannot be increased further. Since the first control face 41 of the inlet diaphragm 21 is larger than the sum of the first and the second portion 35, 37 of the first face 36, the counteracting forces, which likewise originate from the brake pressure, also do not allow the inlet diaphragm 21 to lift from the first diaphragm valve seat 29.

The signal further includes that the outlet solenoid valve 15b remains unenergized and connects its first port 43, which is connected to the pressure input port 26, to its second port 47, which is connected to the outlet control chamber 32 via the second control channel 34, and blocks its third port 48. The brake pressure is then applied to the outlet control chamber 32 and against the second control face 42 of the outlet diaphragm 22, which is then urged in a sealing manner against the second diaphragm valve seat 30. In contrast, the counteracting forces at the outlet diaphragm 22 cannot change owing to the size ratios of the faces 38, 40, 42.

It is assumed that, despite the pressure hold in the brake cylinder 6a, an actual brake slip that is greater than the optimum brake slip is present at the wheel in question. The ABS control in the electronic control unit 10 then causes a signal representing the "pressure reduction" state to be inputted into the electrical signal input port 23. This state is shown in FIG. 6 and FIG. 7.

This signal has the effect that the holding solenoid valve 15a is energized and then connects its first port 43, which is connected to the pressure input port 26, to its second port 44, which is connected via the first control channel 33 to the inlet control chamber 31, and blocks its third port 45. As a result, brake pressure is present in the inlet control chamber and acts on the first control face 41, whereupon the inlet diaphragm 21 is urged in a sealing manner against the first diaphragm valve seat 29. This prevents a supply of brake pressure to the pressure output port 25 and thus into the brake cylinder 6a.

On the other hand, the outlet solenoid valve 15b is also energized in response to the signal and then connects its second port 47, which is connected via the second control channel 34 to the outlet control chamber 32, to its third port 48, which is connected to the pressure relief port 24, and blocks its first port 46. The outlet control chamber 32 is then vented, which has the effect that the outlet diaphragm 22 lifts from the second diaphragm valve seat 30 and a flow connection is created between the pressure output port 25 and the pressure relief port 24, whereby the brake cylinder 6a is vented. Lifting of the outlet diaphragm 22 from the second diaphragm valve seat 30 is assisted by the (still high) brake pressure still acting at the pressure output port 25, which acts via the second channel 52 and the second annular chamber 53 on the first portion 38 of the second face 39 of the outlet diaphragm 22.

The above-described "pressure buildup", "pressure hold" and "pressure reduction" states are brought about alternately in particular by pulse-like activation (energization)/deactivation (deenergization) of the solenoid valves 15a, 15b until the actual brake slip corresponds to the optimum brake slip.

It is clear that the ABS pressure control valve assembly 7a described above is not limited to a use in an electropneumatic brake device according to FIG. 1. Rather, such an ABS pressure control valve assembly 7a can also be used in an electronically brake-pressure-controlled brake system (EBS). The ABS pressure control valve assembly 7a is then arranged between a pressure control module of the EBS and a brake cylinder, wherein the starting pressure of the pressure control module forms the working pressure, which is controlled in a closed loop in the pressure control module in dependence on electrical signals. The ABS control routines can then be implemented, for example, in a local electronic control unit of the pressure control module.

Furthermore, the ABS pressure control valve assembly can also be part of a hydraulic or electrohydraulic service brake device.

A method for producing an above-described ABS pressure control valve assembly 7a according to a first aspect is described hereinbelow, which method is characterized by at least the following successive steps:

a) manufacturing the first housing part 19, the second housing part 20, the intermediate plate 28, the first and second spring element 16a, 16b, and the valve block 56, which comprises or integrates the holding solenoid valve 15a and the outlet solenoid valve 15b, and b) clamping the second housing part 20 in a clamping device and positioning the outlet diaphragm 22, together with the second spring element 16b, and the valve block 56 on the second housing part 20, c) positioning the intermediate plate 28 on the second housing part 20, d) positioning the inlet diaphragm 21, together with the first spring element 16a, on the intermediate plate 28, e) positioning the first housing part 19 on the intermediate plate 28, and f) clamping the first housing part 19 to the second housing part 20.

Consequently, based on the situation shown in FIGS. 2 to 7, on assembly of the ABS pressure control valve assembly 7a, the second clamped housing part 20 is at the bottom and the first housing part 19 is at the top.

Alternatively, the method can be characterized according to a second aspect by at least the following successive steps:

a) manufacturing the first housing part 19, the second housing part 20, the intermediate plate 28, the first and second spring element 16a, 16b, and the valve block 56, which comprises or integrates the holding solenoid valve 15a and the outlet solenoid valve 15b, and b) clamping the first housing part 19 in a clamping device and positioning the inlet diaphragm 21, together with the first spring element 16a, and the valve block 56 on the first housing part 19, c) positioning the intermediate plate 28 on the first housing part 19, d) positioning the outlet diaphragm 22, together with the second spring element 16b, on the intermediate plate 28, e) positioning the second housing part 20 on the intermediate plate 28, and f) clamping the first housing part 19 to the second housing part 20.

Consequently, based on the situation shown in FIGS. 2 to 7, on assembly of the ABS pressure control valve assembly 7a, the first clamped housing part 19 is at the bottom and the second housing part 20 is at the top.

In both these cases, therefore, the ABS pressure control valve assembly 7a is assembled layer by layer from "bottom to top", according to which housing part 19 or 20 is begun with.

LIST OF REFERENCE NUMERALS 1 front axle
2 rear axle
3a/b wheels
4a/b wheels
5a-d speed sensors
6a-d brake cylinders
7a-d pressure control valve assemblies
8 brake pressure line
9 foot-brake valve
10 control unit
11 ASR unit
12 ASR solenoid valve
13 shuttle valve
14a inlet diaphragm valve
14b outlet diaphragm valve
15a holding solenoid valve
15b outlet solenoid valve
16a first spring element
16b second spring element
17 signal lines
18 housing
19 first housing part
20 second housing part
21 inlet diaphragm
22 outlet diaphragm
23 signal input port
24 pressure relief port
25 pressure output port
26 pressure input port
28 intermediate plate
29 first diaphragm valve seat
30 second diaphragm valve seat
31 inlet control chamber
32 outlet control chamber
33 first control channel
34 second control channel
35 first portion first face
36 first face
37 second portion first face
38 first portion second face
39 second face
40 second portion second face
41 first control face
42 second control face
43 first port
44 second port
45 third port
46 first port
47 second port
48 third port
49 first channel
50 first chamber
51 first annular chamber
52 second channel
53 second annular chamber
54 second chamber
55 seals
56 valve block

The invention claimed is:

1. An ABS pressure control valve assembly for controlling the fluid pressure in a pressure-medium-operated brake system of a vehicle with brake-slip control, by which the brake pressure in pressure-medium-operated brake actuators is adaptively adjusted for a lockup tendency of individual wheels of the vehicle, comprising:

a) a housing which has at least two housing parts, namely a first housing part and a second housing part;

b) two diaphragm valves having diaphragms loaded by spring elements, namely an inlet diaphragm valve having an inlet diaphragm and an outlet diaphragm valve having an outlet diaphragm;

c) an electrical signal input port for the inputting of electrical control signals of an electronic control device;

d) solenoid valves, which are activated by the electronic control device, for subjecting the diaphragm valves to pilot control by a control pressure in each case, namely a holding solenoid valve, which subjects the inlet diaphragm valve to pilot control by a first pilot pressure, and an outlet solenoid valve, which subjects the outlet diaphragm valve to pilot control by a second pilot pressure;

e) a pressure relief port, which is connected to a negative pressure source;

f) a pressure output port for the connection of at least one pressure-medium-operated brake actuator;

g) a pressure input port for the connection of a device which generates a brake pressure; and h) an intermediate plate which is arranged between the two housing parts;

wherein:

i) first and second spring elements are supported on the one hand on the intermediate plate and on the other hand on the diaphragms, j) in a first closed position the inlet diaphragm is urged in a sealing manner against a first diaphragm valve seat by at least the first spring element, and in a second closed position the outlet diaphragm is urged in a sealing manner against a second diaphragm valve seat by at least the second spring element, k) in a first lifted position the inlet diaphragm is lifted from the first diaphragm valve seat, whereby the pressure input port is connected to the pressure output port, and in a second lifted position the outlet diaphragm is lifted from the second diaphragm valve seat, whereby the pressure output port is connected to the pressure relief port, l) an outer edge of the inlet diaphragm is clamped between the first housing part and the intermediate plate, and wherein m) the first diaphragm valve seat is formed in the first housing part, wherein n) an outer edge of the outlet diaphragm is clamped between the second housing part and the intermediate plate, o) the second diaphragm valve seat is formed in the second housing part, p) there is formed in the intermediate plate at least a portion of an inlet control chamber which is delimited by the inlet diaphragm and to which the holding solenoid valve applies the first pilot pressure,
q) there is formed in the intermediate plate at least a portion of an outlet control chamber which is delimited by the outlet diaphragm and to which the outlet solenoid valve applies the second pilot pressure, wherein
r) there is formed in the intermediate plate at least a portion of a first control channel which connects the holding solenoid valve to the inlet control chamber,
s) there is formed in the intermediate plate at least a portion of a second control channel which connects the outlet solenoid valve to the outlet control chamber, and
t) a first movement of the inlet diaphragm from the first closed position into the first lifted position and a second movement of the outlet diaphragm from the second closed position into the second lifted position are directed opposite to one another and in the direction towards the intermediate plate;
wherein a) the holding solenoid valve is formed by a first 3/2-way solenoid valve, wherein its first port is connected to the pressure input port, its second port is connected to the first control channel, and
wherein b) the outlet solenoid valve is formed by a second 3/2-way solenoid valve, wherein its first port is connected to the pressure input port, its second port is connected to the second control channel.

2. The ABS pressure control valve assembly of claim 1, wherein:
a) a first portion of a first face, remote from the inlet control chamber, of the inlet diaphragm is subjected to the pressure prevailing at the pressure input port, and a second portion of this first face is subjected to the pressure prevailing at the pressure output port, and
b) a first portion of a second face, remote from the outlet control chamber, of the outlet diaphragm is subjected to the pressure prevailing at the pressure relief port, and a second portion of this second face is subjected to the pressure prevailing at the pressure output port.

3. The ABS pressure control valve assembly of claim 2, wherein:
a) the first portion of the first face is larger than the second portion of the first face, and
b) the first portion of the second face is larger than the second portion of the second face.

4. The ABS pressure control valve assembly of claim 3, wherein:
a) a first control face, facing the inlet control chamber and cooperating with the first diaphragm valve seat, of the inlet diaphragm is larger than the sum of the first portion and the second portion of the first face, and
b) a second control face, facing the outlet control chamber and cooperating with the second diaphragm valve seat, of the outlet diaphragm is larger than the sum of the first portion and the second portion of the second face.

5. The ABS pressure control valve assembly of claim 1, wherein:
a) in the first lifted position of the inlet diaphragm the pressure input port is connected to the pressure output port, and in the first closed position of the inlet diaphragm this connection is broken, and
b) in the second lifted position of the outlet diaphragm the pressure output port is connected to the pressure relief port, and in the second closed position of the outlet diaphragm this connection is broken.

6. The ABS pressure control valve assembly of claim 1, wherein the inlet diaphragm and the outlet diaphragm are arranged coaxially.

7. The ABS pressure control valve assembly of claim 1, wherein:
a) the third port of the holding solenoid valve is connected to the pressure relief port, and
b) the third port of the outlet solenoid valve is connected to the pressure relief port.

8. The ABS pressure control valve assembly of claim 7, wherein the holding solenoid valve cooperates with the inlet diaphragm valve and the outlet solenoid valve cooperates with the outlet diaphragm valve, based on control signals present at the signal input port, such that:
a) in response to a signal representing the pressure-buildup state and present at the signal input port, the holding solenoid valve connects its second port to its third port and blocks its first port, and the outlet solenoid valve connects its first port to its second port and blocks its third port,
b) in response to a signal representing the pressure-hold state and present at the signal input port, the holding solenoid valve connects its first port to its second port and blocks its third port, and the outlet solenoid valve connects its first port to its second port and blocks its third port, and
c) in response to a signal representing the pressure-reduction state and present at the signal input port, the holding solenoid valve connects its first port to its second port and blocks its third port, and the outlet solenoid valve connects its second port to its third port and blocks its first port.

9. The ABS pressure control valve assembly of claim 1, wherein seals are arranged between the first housing part and the intermediate plate and between the second housing part and the intermediate plate.

10. The ABS pressure control valve assembly of claim 1, wherein there is a valve block in the form of a structural unit, which includes or integrates the holding solenoid valve and the outlet solenoid valve.

11. A pressure-medium-operated brake system of a vehicle with brake-slip control, which includes electropneumatic brake system with brake-slip control, comprising:
at least one ABS pressure control valve assembly for controlling the fluid pressure in a pressure-medium-operated brake system of a vehicle with brake-slip control, by which the brake pressure in pressure-medium-operated brake actuators is adaptively adjusted for a lockup tendency of individual wheels of the vehicle, including:
a) a housing which has at least two housing parts, namely a first housing part and a second housing part;
b) two diaphragm valves having diaphragms loaded by spring elements, namely an inlet diaphragm valve having an inlet diaphragm and an outlet diaphragm valve having an outlet diaphragm;
c) an electrical signal input port for the inputting of electrical control signals of an electronic control device;
d) solenoid valves, which are activated by the electronic control device, for subjecting the diaphragm valves to pilot control by a control pressure in each case, namely a holding solenoid valve, which subjects the inlet diaphragm valve to pilot control by a first pilot pressure, and an outlet solenoid valve, which subjects the outlet diaphragm valve to pilot control by a second pilot pressure;
e) a pressure relief port, which is connected to a negative pressure source;

f) a pressure output port for the connection of at least one pressure-medium-operated brake actuator;

g) a pressure input port for the connection of a device which generates a brake pressure; and h) an intermediate plate which is arranged between the two housing parts;

wherein:

i) first and second spring elements are supported on the intermediate plate and on the diaphragms, j) in a first closed position the inlet diaphragm is urged in a sealing manner against a first diaphragm valve seat by at least the first spring element, and in a second closed position the outlet diaphragm is urged in a sealing manner against a second diaphragm valve seat by at least the second spring element, k) in a first lifted position the inlet diaphragm is lifted from the first diaphragm valve seat, whereby the pressure input port is connected to the pressure output port, and in a second lifted position the outlet diaphragm is lifted from the second diaphragm valve seat, whereby the pressure output port is connected to the pressure relief port, l) an outer edge of the inlet diaphragm is clamped between the first housing part and the intermediate plate, and wherein m) the first diaphragm valve seat is formed in the first housing part, wherein n) an outer edge of the outlet diaphragm is clamped between the second housing part and the intermediate plate, o) the second diaphragm valve seat is formed in the second housing part, p) there is formed in the intermediate plate at least a portion of an inlet control chamber which is delimited by the inlet diaphragm and to which the holding solenoid valve applies the first pilot pressure, q) there is formed in the intermediate plate at least a portion of an outlet control chamber which is delimited by the outlet diaphragm and to which the outlet solenoid valve applies the second pilot pressure, wherein r) there is formed in the intermediate plate at least a portion of a first control channel which connects the holding solenoid valve to the inlet control chamber, s) there is formed in the intermediate plate at least a portion of a second control channel which connects the outlet solenoid valve to the outlet control chamber, and t) a first movement of the inlet diaphragm from the first closed position into the first lifted position and a second movement of the outlet diaphragm from the second closed position into the second lifted position are directed opposite to one another and in the direction towards the intermediate plate;

wherein a) the holding solenoid valve is formed by a first 3/2-way solenoid valve, wherein its first port is connected to the pressure input port, its second port is connected to the first control channel, and wherein b) the outlet solenoid valve is formed by a second 3/2-way solenoid valve, wherein its first port is connected to the pressure input port, its second port is connected to the second control channel.

12. The brake system of claim 11, wherein:

a) a first portion of a first face, remote from the inlet control chamber, of the inlet diaphragm is subjected to the pressure prevailing at the pressure input port, and a second portion of this first face is subjected to the pressure prevailing at the pressure output port, and b) a first portion of a second face, remote from the outlet control chamber, of the outlet diaphragm is subjected to the pressure prevailing at the pressure relief port, and a second portion of this second face is subjected to the pressure prevailing at the pressure output port.

13. The brake system of claim 11, wherein the device which generates a brake pressure is formed by a pneumatic foot-brake valve or by an electropneumatic pressure control module.

14. The brake system of claim 11, wherein the electronic control device is formed by an ABS controller or by a controller in which ABS routines are implemented.

15. A method for producing an ABS pressure control valve assembly, the method comprising:

a) manufacturing the first housing part, the second housing part, the intermediate plate, first and second spring elements, and a valve block which comprises or integrates the holding solenoid valve and the outlet solenoid valve, and b) clamping the second housing part in a clamping device and positioning the outlet diaphragm, together with the second spring element, and the valve block on the second housing part, c) positioning the intermediate plate on the second housing part, d) positioning the inlet diaphragm, together with the first spring element, on the intermediate plate, e) positioning the first housing part on the intermediate plate, and f) clamping the first housing part to the second housing part;

wherein the at least one ABS pressure control valve assembly is for controlling the fluid pressure in a pressure-medium-operated brake system of a vehicle with brake-slip control, by which the brake pressure in pressure-medium-operated brake actuators is adaptively adjusted for a lockup tendency of individual wheels of the vehicle, including:

a) a housing which has at least two housing parts, namely a first housing part and a second housing part;

b) two diaphragm valves having diaphragms loaded by spring elements, namely an inlet diaphragm valve having an inlet diaphragm and an outlet diaphragm valve having an outlet diaphragm;

c) an electrical signal input port for the inputting of electrical control signals of an electronic control device;

d) solenoid valves, which are activated by the electronic control device, for subjecting the diaphragm valves to pilot control by a control pressure in each case, namely a holding solenoid valve, which subjects the inlet diaphragm valve to pilot control by a first pilot pressure, and an outlet solenoid valve, which subjects the outlet diaphragm valve to pilot control by a second pilot pressure;

e) a pressure relief port, which is connected to a negative pressure source;

f) a pressure output port for the connection of at least one pressure-medium-operated brake actuator;

g) a pressure input port for the connection of a device which generates a brake pressure; and h) an intermediate plate which is arranged between the two housing parts;

wherein:

i) first and second spring elements are supported on the intermediate plate and on the diaphragms, j) in a first closed position the inlet diaphragm is urged in a sealing manner against a first diaphragm valve seat by at least the first spring element, and in a second closed position the outlet diaphragm is urged in a sealing manner against a second diaphragm valve seat by at least the second spring element, k) in a first lifted position the inlet diaphragm is lifted from the first diaphragm valve seat, whereby the pressure input port is connected to the pressure output port, and in a second lifted position the outlet diaphragm is lifted from the second diaphragm valve seat, whereby the pressure output port is connected to the pressure relief port, l) an outer edge of the inlet diaphragm is clamped between the first housing part and the intermediate plate, and wherein m) the first diaphragm valve seat is formed in the first housing part, wherein n) an outer edge of the outlet diaphragm is clamped between the second housing part and the intermediate plate, o) the second diaphragm valve seat is formed in the second housing part, p) there is formed in the intermediate plate at least a portion of an inlet control chamber which is delimited by the inlet diaphragm and to which the holding solenoid valve applies the first pilot pressure, q) there is formed in the intermediate plate at least a portion of an outlet control chamber which is delimited by the outlet diaphragm and to which the outlet solenoid valve applies the second pilot pressure, wherein r) there is formed in the intermediate plate at least a portion of a first control channel which connects the holding solenoid valve to the inlet control chamber, s) there is formed in the intermediate plate at least a portion of a second control channel which connects the outlet solenoid valve to the outlet control chamber, and t) a first movement of the inlet diaphragm from the first closed position into the first lifted position and a second movement of the outlet diaphragm from the second closed position into the second lifted position are directed opposite to one another and in the direction towards the intermediate plate;

wherein a) the holding solenoid valve is formed by a first 3/2-way solenoid valve, wherein its first port is connected to the pressure input port, its second port is connected to the first control channel, and wherein b) the outlet solenoid valve is formed by a second 3/2-way solenoid valve, wherein its first port is connected to the pressure input port, its second port is connected to the second control channel.

16. A method for producing an ABS pressure control valve assembly, the method comprising:

a) manufacturing the first housing part, the second housing part, the intermediate plate, first and second spring elements, and a valve block which comprises or integrates the holding solenoid valve and the outlet solenoid valve, and b) clamping the first housing part in a clamping device and positioning the inlet diaphragm, together with the first spring element, and the valve block on the first housing part, c) positioning the intermediate plate on the first housing part, d) positioning the outlet diaphragm, together with the second spring element, on the intermediate plate, e) positioning the second housing part on the intermediate plate, and f) clamping the first housing part to the second housing part;

wherein the at least one ABS pressure control valve assembly is for controlling the fluid pressure in a pressure-medium-operated brake system of a vehicle with brake-slip control, by which the brake pressure in pressure-medium-operated brake actuators is adaptively adjusted for a lockup tendency of individual wheels of the vehicle, including:

a) a housing which has at least two housing parts, namely a first housing part and a second housing part;

b) two diaphragm valves having diaphragms loaded by spring elements, namely an inlet diaphragm valve having an inlet diaphragm and an outlet diaphragm valve having an outlet diaphragm;

c) an electrical signal input port for the inputting of electrical control signals of an electronic control device;

d) solenoid valves, which are activated by the electronic control device, for subjecting the diaphragm valves to pilot control by a control pressure in each case, namely a holding solenoid valve, which subjects the inlet diaphragm valve to pilot control by a first pilot pressure, and an outlet solenoid valve, which subjects the outlet diaphragm valve to pilot control by a second pilot pressure;

e) a pressure relief port, which is connected to a negative pressure source;

f) a pressure output port for the connection of at least one pressure-medium-operated brake actuator;

g) a pressure input port for the connection of a device which generates a brake pressure; and h) an intermediate plate which is arranged between the two housing parts;

wherein:

i) first and second spring elements are supported on the intermediate plate and on the diaphragms, j) in a first closed position the inlet diaphragm is urged in a sealing manner against a first diaphragm valve seat by at least a first spring element, and in a second closed position the outlet diaphragm is urged in a sealing manner against a second diaphragm valve seat by at least the second spring element, k) in a first lifted position the inlet diaphragm is lifted from the first diaphragm valve seat, whereby the pressure input port is connected to the pressure output port, and in a second lifted position the outlet diaphragm is lifted from the second diaphragm valve seat, whereby the pressure output port is connected to the pressure relief port, l) an outer edge of the inlet diaphragm is clamped between the first housing part and the intermediate plate, and wherein m) the first diaphragm valve seat is formed in the first housing part, wherein n) an outer edge of the outlet diaphragm is clamped between the second housing part and the intermediate plate, o) the second diaphragm valve seat is formed in the second housing part, p) there is formed in the intermediate plate at least a portion of an inlet control chamber which is delimited by the inlet diaphragm and to which the holding solenoid valve applies the first pilot pressure, q) there is formed in the intermediate plate at least a portion of an outlet control chamber which is delimited by the outlet diaphragm and to which the outlet solenoid valve applies the second pilot pressure, wherein
r) there is formed in the intermediate plate at least a portion of a first control channel which connects the holding solenoid valve to the inlet control chamber,
s) there is formed in the intermediate plate at least a portion of a second control channel which connects the outlet solenoid valve to the outlet control chamber, and
t) a first movement of the inlet diaphragm from the first closed position into the first lifted position and a second movement of the outlet diaphragm from the second closed position into the second lifted position are directed opposite to one another and in the direction towards the intermediate plate;
wherein a) the holding solenoid valve is formed by a first 3/2-way solenoid valve, wherein its first port is connected to the pressure input port, its second port is connected to the first control channel, and
wherein b) the outlet solenoid valve is formed by a second 3/2-way solenoid valve, wherein its first port is connected to the pressure input port, its second port is connected to the second control channel.

* * * * *